June 4, 1963

L. PÉRAS 3,092,712

AUXILIARY APPARATUS FOR AUTOMATIC LINE
WELDING, NOTABLY FUEL TANKS

Filed Feb. 10, 1961

Inventor
Lucien Péras
By Stevens Davis Miller & Mosher
Attorneys

June 4, 1963  L. PÉRAS  3,092,712
AUXILIARY APPARATUS FOR AUTOMATIC LINE
WELDING, NOTABLY FUEL TANKS
Filed Feb. 10, 1961  3 Sheets-Sheet 2

Inventor
Lucien Peras
By Stevens Davis Miller & Mosher
Attorneys

June 4, 1963
L. PÉRAS
3,092,712
AUXILIARY APPARATUS FOR AUTOMATIC LINE
WELDING, NOTABLY FUEL TANKS
Filed Feb. 10, 1961
3 Sheets-Sheet 3
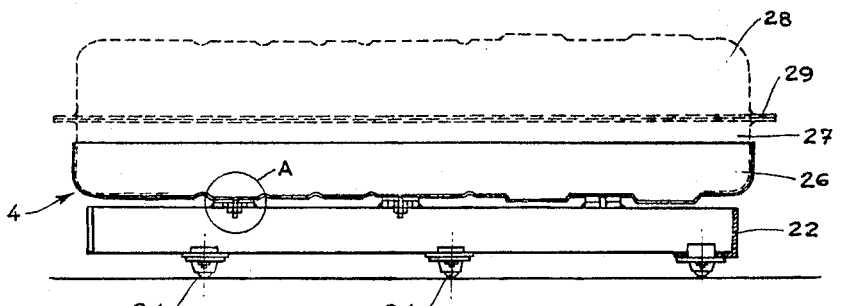
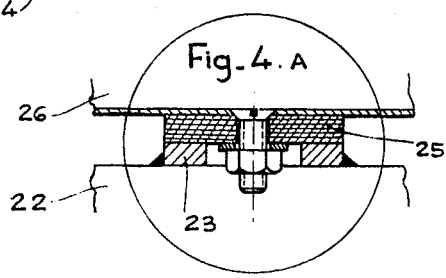
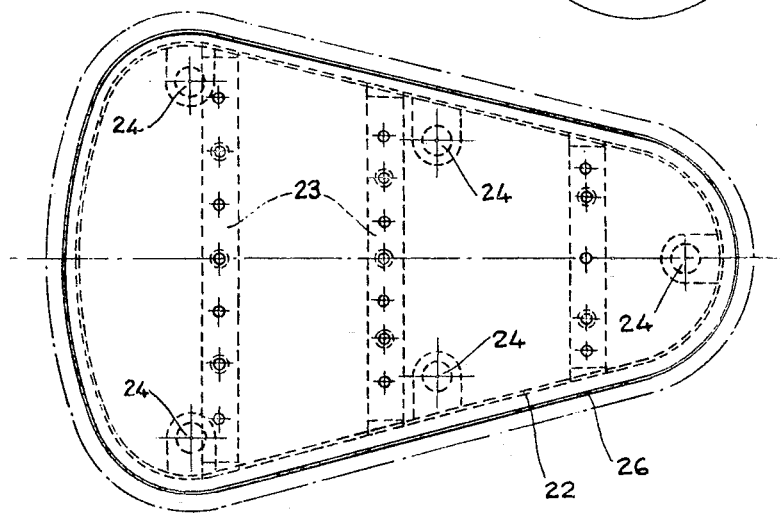
Inventor
Lucien Peras
By Stevens Davis Miller & Mosher
Attorneys United States Patent Office 3,092,712
Patented June 4, 1963

3,092,712
AUXILIARY APPARATUS FOR AUTOMATIC LINE WELDING, NOTABLY FUEL TANKS
Lucien Péras, Billancourt, France, assignor to Regie Nationale des Usines Renault, Billancourt, France
Filed Feb. 10, 1961, Ser. No. 88,483
Claims priority, application France Feb. 23, 1960
5 Claims. (Cl. 219—81)

This invention relates to line welding and has specific reference to an automatic apparatus adapted to weld the two halves of a pressed fuel tank or any other similar parts, without any other manual handling steps than placing the part in the corresponding templet, jig or mounting, and removing the welded part therefrom.

More specifically, the apparatus constituting the subject-matter of this invention constitutes an auxiliary system for a welding machine having two welding rollers, and comprises essentially:

A table adjustable in position with respect to the welding rollers of the machine;

A mounting or jig adapted to receive the tank or like part to be welded and characterized by a complete liberty of movement of the table, and A guide roller rotatable about a vertical axis and adjustably mounted on the table, whereby the mounting or jig may be held in the desired and proper position for performing the welding operation, the mounting and workpiece assembly being driven from the welding rollers themselves.

In order to afford a clearer understanding of this invention and of the manner in which the same may be carried out in practice, reference will now be made to the accompanying drawings illustrating diagrammatically by way of example a typical embodiment of the invention.

In the drawings:

FIGURES 4, 4a and 5 illustrate the tank-supporting jig.

Figure 1:
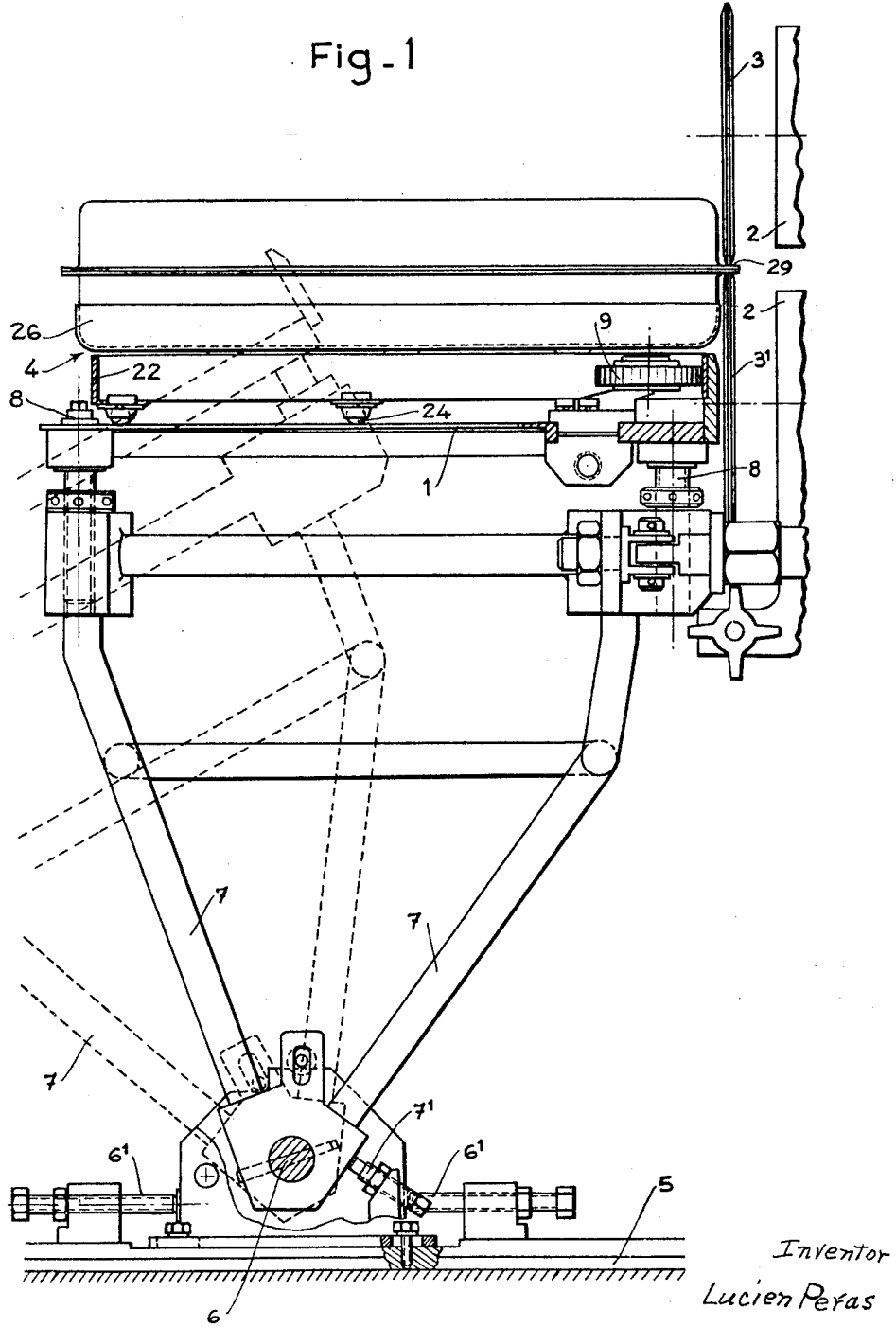
FIGURE 1 is a part-sectional front elevational view showing an apparatus constructed according to the teachings of this invention, with the table supporting the workpiece, and the guide roller.

Referring to the drawings, the apparatus illustrated notably in FIG. 1 comprises a table or bench 1 adapted to be brought in front of a line welding machine shown diagrammatically at 2 and comprising a pair of welding rollers 3, 3¹ adapted to be rotatably driven and moved away and toward each other through means not shown, as in conventional welding practice. The table 1 adapted to support the mounting or jig 4 is connected to the frame structure 5 of the welding machine through a pivot 6, the axis of this pivot extending at right angles to the axes of the welding rollers 3, 3¹. This pivotal mounting may be locked in the proper adjustment position obtained by turning the screw 6¹ in or out. The hingedly mounted structure 7 supporting the table 1 co-acts notably with an adjustable stop 7¹ and carries adjustment screws 8 supporting the table 1. Thus, the table is adjustable both vertically and angularly about an axis extending at right angles to the axes of the welding rollers.

Figure 2:
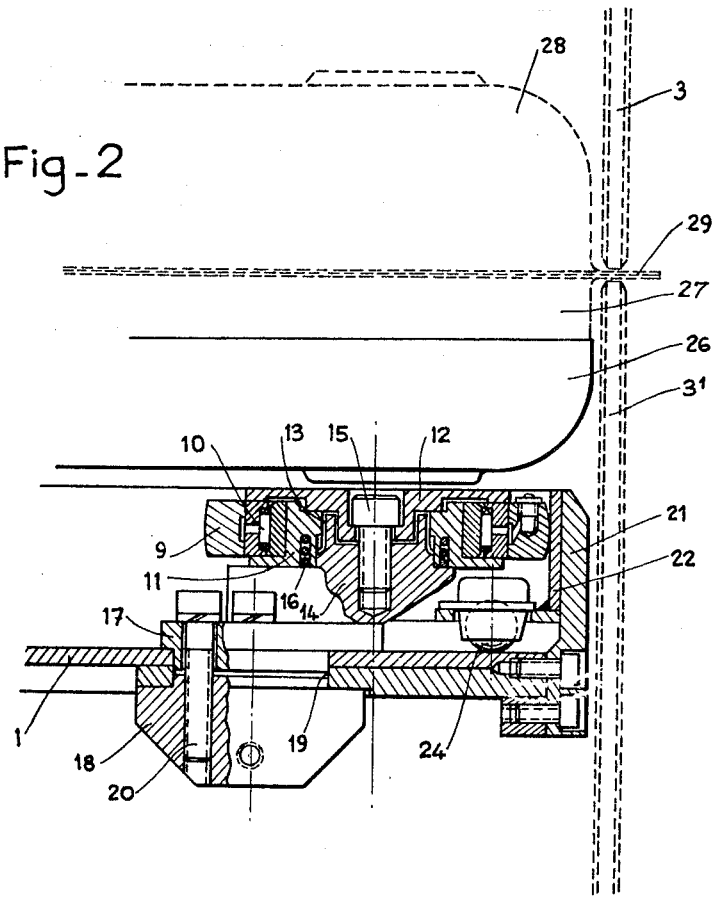
FIGURE 2 illustrates on a larger scale, in vertical axial section, the mounting of the guide roller.
Figure 3:
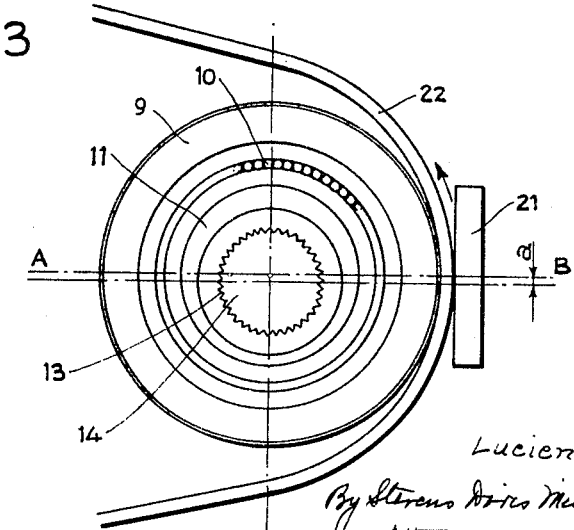
FIGURE 3 is a plan view from above showing the guide roller and the adjacent components, the cover of the guide roller being removed.

A guide roller 9 illustrated more particularly in FIGS. 2 and 3 of the drawings is adjustably mounted on the table 1 in close proximity of the welding rollers 3, 3¹. This guide roller 9 is mounted on a needle roller bearing 10 fitted between a supporting ring 11 and a cover plate 12.

The supporting ring 11 is formed with an internal set of teeth meshing at 13 with the external teeth of a hub 14 for mounting the guide roller. The set of internal teeth of ring 11 is eccentric so that when the relative angular position of the ring 11 and of the aforesaid hub 14 is modified the guide roller 9 will be shifted accordingly, with a high degree of precision, toward and away from the plane of the welding rollers 3, 3¹. When this adjustment is completed the cover plate 12 is locked on the hub 14 by means of a screw 15. The aforesaid ring 11 is formed with a circular recess receiving a compression spring 16 to facilitate its removal when it is desired to remove or adjust the guide roller 9.

In addition, the hub 14 is an integral part of a support made of two components 17, 18 slidably mounted in a slot 19 formed in the table 1 at right angles to the axes of the welding rollers 3, 3¹. After selecting the proper position of the parts 17, 18 in this slot, the support is locked therein by means of screws 20. This support 17, 18 may be properly adjusted in the slot 19 by means of adjustment screws (not shown) co-acting with part 18 and extending at right angles to the plane of the FIGURE 2.

On the other hand, a plate 21 is secured to the table 1 at right angles to the general plane thereof.

The welding mounting or jig illustrated in FIGS. 4 and 5 of the drawings comprises a rigid frame 22 constituting essentially a vertical wall corresponding in shape and parallel to the welding line to be made. This frame 22 has its upper portion properly braced as shown at 23 in order to maintain its stiffness during the operation of the machine, and carries under its lower face a number of balls 24 permitting its movement in all directions. If desired, any other suitable means may be substituted for these balls, such as casters, plastic studs, and the like. Mounted on the upper portion of the jig 22, that is, on the bracing members 23, with the interposition of electrical insulators 25 (see FIG. 4A), is a pan 26 corresponding in shape to the lower portion of the fuel tank to be welded, which consists of two halves 27, 28.

The machine described hereinabove operates as follows:

The frame 22 of the welding jig is engaged between the guide roller 9 and the plate 21 (FIG. 2). It will be seen that the position of the balls 24 and bracing members 23 has been selected with a view not to interfere with the guide roller 9 during the various movements to be accomplished by the assembly. The fuel tank to be welded, which consists of two pressed halves 27 and 28 connected along their registering flanges 29 held in contact by a few preliminary weld spots, is placed into the pan 26 of jig 22. The flanges 29 are inserted between the welding rollers 3, 3¹ and these are moved toward each other in order to apply the mechanical pressure necessary to perform the welding operation. Then the welding rollers 3, 3¹ are rotated and their movement carries along the tank and its jig. Due to the presence of the guide roller 9, plate 21 and frame 22, the jig will constantly so move as to cause the welding rollers to form a welding line strictly parallel to the edges of the tank. In FIG. 3 it will be noted that the axis of roller 9 lies slightly behind (by a distance $a$) the axis AB of the welding rollers with respect to the direction of feed of the jig during the welding operation. This shift is extremely important for it makes it possible for the jig to be constantly set in the proper direction under the influence of the driving action produced by the welding rollers and by the reaction of the guide roller on the jig, for it is obvious that this reaction would not occur if these axes were coincident with each other. This shift is determined experimentally, and this accounts for the possibility of adjusting with a considerable degree of precision the position of guide roller 9 on table 1 under the circumstances already set forth hereinabove.

Similarly, the wall of frame 22 which is to slide between the guide roller 9 and plate 21 should have a strictly constant thickness in order to avoid abnormal frictional contacts likely to produce burnt weld spots.

By properly adjusting the position of table 1 it is possible to adapt different jigs or mounting on the machine and more particularly to compensate the wear of the welding rollers.

A timing mechanism (not shown) is provided for determining the time period during which the welding rollers 3, $3^1$ are driven and energized so as to weld completely the flanges 29 of the tank. The use of a timing mechanism is preferred in lieu of limit switches controlled by the jig, for it permits of beginning the welding operation at any desired location around the tank.

Although the present invention has been described in conjunction with a preferred embodiment and notably in connection with the welding of a fuel tank, it is to be understood that modifications and variations may be resorted to and that other structures, parts and components may be welded without departing from the spirit and scope of the invention, as those skilled in the art will readily understand. Such modifications and variations are considered to be within the purview and scope of the invention and appended claims.

I claim:
1. Auxiliary apparatus for automatically welding joints between two parts of a workpiece made of two halves, such as a fuel tank, characterized in that it comprises a table adjustable in position with respect to the welding rollers of the line welding machine, a jig for supporting the work to be welded, and a roller for guiding this jig, said guide roller having a vertical axis and being adjustably mounted on said table, said guide roller being adapted, in combination with a vertical plate solid with said table, to engage a corresponding edge of said jig, said line welding rollers engaging the edges of the two parts of the workpiece and causing by their rotation the movement of said workpiece and of said jig on said table.

2. Auxiliary apparatus according to claim 1, characterized in that said jig comprises a rigid frame mounted on balls or the like and having a contour parallel to that of the line of weld; said frame being suitably braced at its upper portion and supporting through the medium of electrical insulators a pan or like member corresponding in shape to the lower portion of the workpiece to be welded.

3. Auxiliary apparatus according to claim 1 characterized in that the axis of said guide roller is slightly shifted behind the axis of the welding rollers in relation to the direction of feed of the jig during the welding operation, thereby permitting of setting the jig at any time in the proper direction under the influence of the welding and driving rollers and of the reaction produced by said guide roller on said jig.

4. Auxiliary apparatus according to claim 1, characterized in that said guide roller is adjustably mounted to permit accurate alterations of the distance from its axis to the plane of the welding rollers and also of its position in a direction parallel to said plane.

5. Auxiliary apparatus according to claim 1, characterized in that said table is adjustable vertically through a frame structure having its base pivotally mounted about an axis extending at right angles to the axes of said welding rollers, the inclination of said frame structure being adjustable as well as the horizontal distance between its pivot axis and the plane of said welding rollers.

References Cited in the file of this patent
UNITED STATES PATENTS

| 2,347,185 | Fentress | Apr. 25, 1944 |
| 2,558,360 | Jadoul | June 26, 1951 |

FOREIGN PATENTS

| 710,539 | Great Britain | June 16, 1954 |